United States Patent
Suh (10) Patent No.: US 7,768,580 B2
(45) Date of Patent: Aug. 3, 2010

(54) IMAGE DISPLAY DELAY TIME SHORTENING APPARATUS DURING CHANNEL CHANGE, METHOD THEREOF AND BROADCASTING RECEIVING APPARATUS THEREOF

(75) Inventor: Jong Yeul Suh, Gwanak-gu (KR)

(73) Assignee: LG Electronics Inc., Seoul (KR)

( * ) Notice: Subject to any disclaimer, the term of this patent is extended or adjusted under 35 U.S.C. 154(b) by 1031 days.

(21) Appl. No.: 11/352,330

(22) Filed: Feb. 13, 2006

(65) Prior Publication Data

US 2006/0184981 A1 Aug. 17, 2006

(30) Foreign Application Priority Data

Feb. 14, 2005 (KR) .................... 10-2005-0012043

(51) Int. Cl.
*H04N 5/50* (2006.01)

(52) U.S. Cl. .................. 348/731; 348/553; 348/725; 725/151; 725/38

(58) Field of Classification Search ......... 348/731–732, 348/725–727, 432–437, 461, 473, 569, 735–734, 348/553; 455/4.2, 5.1, 182.3, 186.1; 725/38, 725/132, 140, 152, 151; *H04N 5/50*
See application file for complete search history.

(56) References Cited

U.S. PATENT DOCUMENTS

| 5,594,492 | A | * | 1/1997 | O'Callaghan et al. ....... 725/151 |
| 6,016,172 | A | * | 1/2000 | Huh ...................... 375/240.27 |
| 6,118,498 | A | * | 9/2000 | Reitmeier ................... 348/725 |
| 6,985,188 | B1 | * | 1/2006 | Hurst, Jr. .................... 348/553 |
| 7,142,255 | B2 | * | 11/2006 | Nohrden ..................... 348/725 |

* cited by examiner

*Primary Examiner*—Trang U Tran
(74) *Attorney, Agent, or Firm*—Birch, Stewart, Kolasch & Birch, LLP (57) ABSTRACT

An image display delay time shortening apparatus during channel change, a method thereof and a broadcasting receiving apparatus thereof are disclosed. The broadcasting receiving apparatus extracts a sequence header from a video stream of the received broadcasting signal if a broadcasting signal of each channel is received. Henceforth, the broadcasting receiving apparatus extracts a sequence header corresponding to a changed channel from a relevant region of a channel information table in a memory to establish an initial value of a decoder, so that an image can be displayed with any time delay even if the sequence header is not received at the start of channel change.

11 Claims, 5 Drawing Sheets

IMAGE DISPLAY DELAY TIME SHORTENING APPARATUS DURING CHANNEL CHANGE, METHOD THEREOF AND BROADCASTING RECEIVING APPARATUS THEREOF

This application claims priority to an application filed in the Korean Industrial Property Office on Feb. 14, 2005, and assigned serial No. 10-2005-0012043, the contents of which are incorporated herein by reference.

BACKGROUND OF THE INVENTION

1. Field of the Invention

The present invention relates to an image display delay time shortening apparatus during channel change, a method thereof and a broadcasting receiving apparatus thereof, and more particularly to an image display delay time shortening apparatus during channel change, a method thereof and a broadcasting receiving apparatus thereof by which a sequence header is detected from a received video stream and stored in a relevant region of a channel information table in a memory, and a sequence header corresponding to a channel changed when the channel is to be changed is extracted from the relevant region of the channel information table to establish an initial value of a decoder, thereby enabling to shorten a time in which an image starts to be displayed.

2. Description of the Related Art

In an analogue television (TV) receiver conforming to NTSC (National Television Standard Committee) protocol, a channel change is implemented in such a manner that a tuning frequency is changed by a channel change signal and a broadcasting signal corresponding to the tuning frequency is received.

In the NTSC signal, horizontal and vertical synchronous information are respectively received in the interval of 63 μs and 33 ms, and the analogue TV receiver uses the information for channel change to rapidly display the received broadcasting signal on a screen.

However, when a digital TV receiver displays on a screen a digital broadcasting signal by receiving the digital broadcasting signal according to ATSC (Advanced Television Standards Committee) protocol, much more time is consumed compared with displaying of an image on a screen by receiving the analogue broadcasting signal because a moving picture data encoded by MPEG (Moving Picture Experts Group) protocol should be decoded.

To be more specific, moving picture data of a digital broadcasting signal differs in terms of resolutions, aspect ratios of pixels, and display period of images. As a result, a digital broadcasting signal contains a sequence header including information on resolutions and aspect ratios of pixels. A digital TV receiver extracts a sequence header from a received digital broadcasting signal and establishes an initial value of a video decoder according to the extracted sequence header. The video decoder decodes a video stream in response to the initial value.

The sequence header is stored in an elementary stream packet and transferred. Therefore, the digital TV receiver uses a Program Specific Information (PSI) included in the received digital broadcasting signal to extract a Program Identifier (PI), and seeks the elementary stream packet from the extracted PI to extract a sequence header.

The sequence header is recommended to be inserted into a digital image signal per 0.5 second and transmitted in the ATSC digital television standard document A/54, but it is just a recommendation. Accordingly, there is a difference in an insertion time of the sequence header according to broadcasting stations or broadcasting contents producers, and practically, broadcasting stations or broadcasting contents producers insert a sequence header into a digital image signal at a time interval longer than the recommended time of 0.5 second.

When a channel of a digital TV receiver is changed, a video decoder immediately implements a decoding operation to thereby enable to display an image within an instant time if a sequence header is included in a digital broadcasting signal received at the start of the channel change.

However, if the sequence header is not contained in the digital broadcasting signal received at the start of channel change, an initial value of the video decoder cannot be established resulting in non-implementation of the decoding operation. Consequently, the video decoder waits until the sequence header is received, and starts to display the image on a screen once the sequence header is received.

If the channel is changed, the video decoder is reset to delete initial values of the decoder erstwhile established. As a result, if the sequence header is not contained in the video stream received at the start of the channel change, the decoder cannot establish an initial value and implement the decoding, such that the decoder should wait until the sequence header is received.

An image display delay time reportedly occurs for 1~2 seconds on the average. If a channel is changed, viewers can view images once the image display delay time passes.

SUMMARY OF THE INVENTION

The object of the present invention is to provide an image display delay time shortening apparatus during channel change, a method thereof and a broadcasting receiving apparatus thereof by which a sequence header is detected from a received video stream and stored in a relevant region of a channel information table in a memory, and a sequence header corresponding to a channel changed when the channel is to be changed is extracted from the relevant region of the channel information table to establish an initial value of a decoder, thereby enabling to shorten a time in which an image starts to be displayed.

In accordance with the object of the invention, an image display delay time shortening apparatus during channel change comprises: a detector for extracting at least one of a program identifier (PI) and a sequence header from data stream and video stream initially inputted following a broadcasting channel change and outputting at least one of them; a memory; a controller for extracting the sequence header previously stored in the memory corresponding to the PI if there is no sequence header in front of the video stream initially inputted from the detector following the broadcasting channel change as a result of discrimination based on output of the detector; and a sequence header inserter for inserting the sequence header extracted by the controller into the video stream and outputting the video stream inserted by the sequence header.

The detector extracts a PI and a sequence header from data streams and video streams continuously received prior to and after the broadcasting channel change, and the controller stores the sequence header corresponding to the PI whenever the sequence header and the PI are received from the detector.

The controller stores a horizontal size of a screen, a vertical size of a screen, an aspect ratio of a pixel, an image display period and number of bit per second contained in the sequence header thus extracted, in storing the extracted sequence header in the memory.

The controller may comprise: a sequence header detection discriminator for discriminating whether a sequence header is contained in front of a video stream initially inputted from the detector following the broadcasting channel change based on the output of the detector; and a sequence header extractor for extracting the sequence header previously stored in the memory corresponding to the PI and outputting the sequence header to the sequence header inserter if the sequence header is not contained in the front of the video stream as a result of the discrimination by the sequence header detection discriminator.

According to another embodiment of the present invention, a broadcasting receiving apparatus comprises: a video decoder for decoding a video stream outputted by the sequence header inserter; and a display apparatus for visually displaying and recognizing the data decoded by the video decoder, in addition to the detector, the memory, the controller and the sequence header inserter, each mentioned earlier.

According to yet another embodiment of the present invention, an image display delay time shortening method during channel change comprises: detecting at least one of a program identifier (PI) and a sequence header from data stream and video stream separated from an initially received transfer stream following a broadcasting channel change; extracting a previously stored sequence header corresponding to the PI if there is no sequence header in front of the video stream initially separated following the broadcasting channel change as a result of discrimination from the detecting step; inserting the extracted sequence header into the video stream; and decoding the video stream inserted into the sequence header and displaying it as a visually recognizable image.

The image display delay time shortening method may further comprise extracting a PI and a sequence header from data streams and video streams continuously received prior to or following the broadcasting channel change and storing the PI and the sequence header.

Preferably, the step of extracting and storing the sequence header comprises storing the extracted PI and the sequence header in a predetermined table corresponding to a channel number, and the table is renewed by the PI and the sequence header extracted from the data streams and the video streams continuously received prior to or following the broadcasting channel change.

Preferably, the step of extracting and storing the sequence header comprises extracting a horizontal size of a screen, a vertical size of a screen, an aspect ratio of a pixel, an image display period and the number of bit per second from the extracted sequence header and storing them.

BRIEF DESCRIPTION OF THE DRAWINGS

The present invention will become more apparent by describing, in detail, exemplary embodiments thereof with reference to the attached drawing, which are given by way of illustration only and thus do not limit the exemplary embodiments of the present invention.

DESCRIPTION OF THE PREFERRED EMBODIMENTS

Next, preferred embodiments of the present invention will be described in detail below by referring to the attached drawings.

Figure 1:
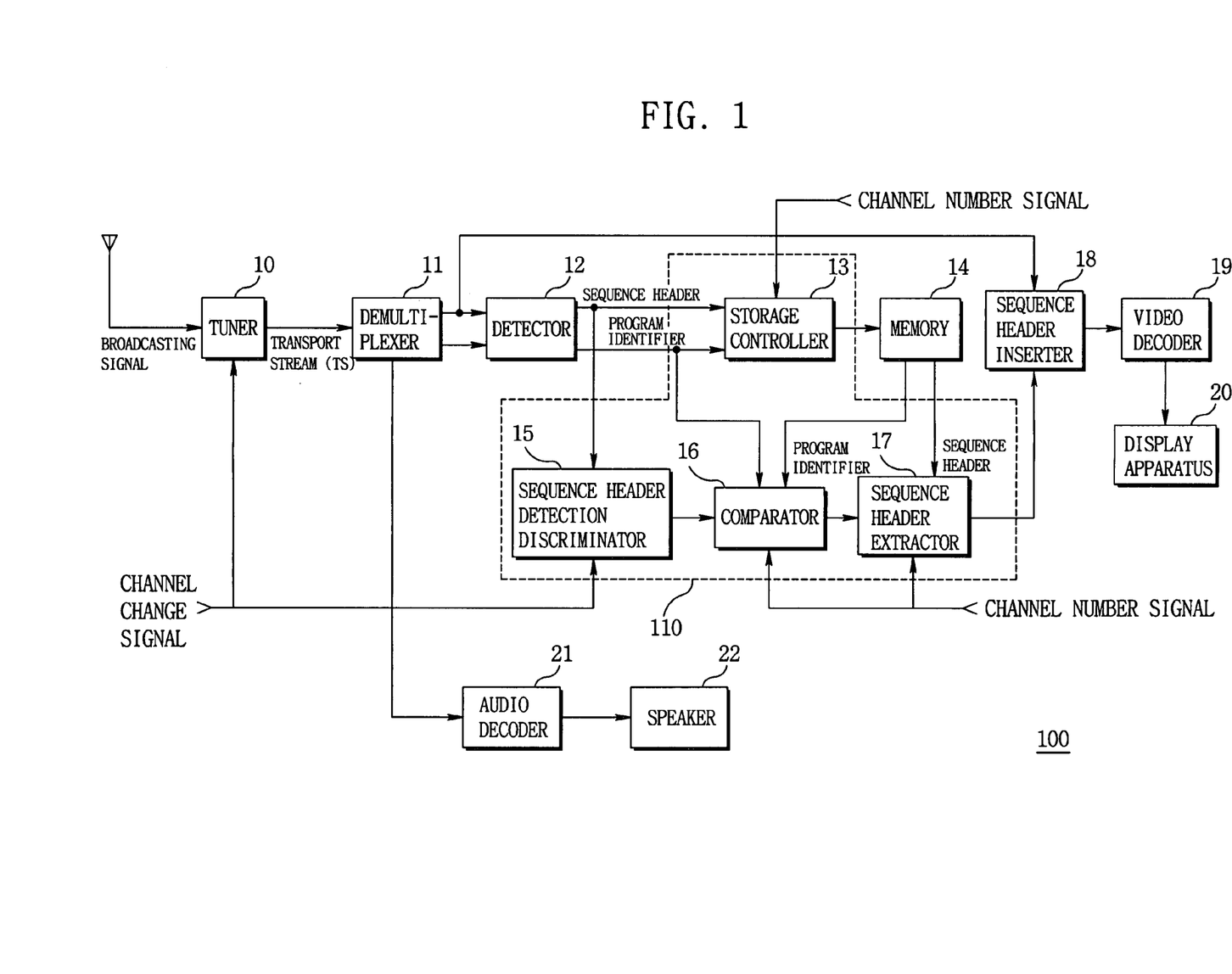
FIG. 1 is a block diagram of a broadcasting receiving apparatus according to one embodiment of the present invention.

FIG. 1 is a block diagram of a broadcasting receiving apparatus according to one embodiment of the present invention.

A broadcasting receiving apparatus 100 according to the present invention can receive and display a digital broadcasting signal. Furthermore, the broadcasting receiving apparatus 100 extracts sequence headers from video streams of each digital broadcasting channel and separately stores them. The broadcasting receiving apparatus 100 uses the stored sequence headers to establish an initial value of a video decoder even though the sequence headers are not instantly received during channel change. As a result, the broadcasting receiving apparatus 100 displays the digital broadcasting signal without delaying images during the channel change.

The broadcasting receiving apparatus 100 according to the present invention may be a TV set, a set top box (STB), or any other apparatus as long as it can receive a digital broadcasting.

Referring to FIG. 1, the broadcasting receiving apparatus 100 includes a tuner 10, a demultiplexer 11, a detector 12, a memory, 14, a controller 110, a sequence header inserter 18, a video decoder 19, a display apparatus 20, an audio decoder 21 and a speaker 22.

The tuner 10 changes a channel by selecting a digital broadcasting signal of a predetermined channel according to a channel change command from a user and outputting a transport stream.

The demultiplexer 11 separates the transport stream outputted from the tuner 10 into a video stream, an audio stream and a data stream.

The demultiplexer 11 outputs the separated video stream to the detector 12 and the sequence header inserter 18, and outputs the audio stream to the audio decoder 21. Furthermore, the demultiplexer 11 outputs the separated data stream to the detector 12.

The demultiplexer 11 checks an initially inputted transport stream following the channel change, and advises to the controller 110 the number of a video stream separated from the initially inputted transport stream.

The audio decoder 21 decodes the audio stream separated from the demultiplexer 11 to an audio signal and outputs it to the speaker 22.

The detector 12 detects a sequence header from the video stream separated from the demultiplexer 11, and detects a Program Identifier (PI) from the data stream. The PI is included in Program Specific Information (PSI) of the data stream and is transmitted. The detector 12 outputs the detected sequence header and the PI to the controller 110.

The controller 110 corresponds the sequence header and the PI inputted from the detector 12 to relevant channel numbers and stores them in the memory 14 and controls them.

The controller 110 receives a channel change signal and discriminates whether the sequence header is contained in front of the video stream initially inputted from the detector 12 following the channel change. Only if the sequence header is not contained in front of the video stream initially inputted from the detector 12 following the channel change, and only if the PI inputted from the changed channel and the PI previously stored by being corresponded to the relevant channel number are identical, the controller 110 outputs the sequence header stored in the memory 14 to the sequence header inserter 18.

In order to implement the aforementioned operation, the controller 110 includes a storage controller 13, a sequence header detection discriminator 15, a comparator 16 and a sequence header extractor 17, and performs the functions thereof.

The storage controller 13 receives a predetermined channel number signal and receives the sequence header and the PI received from the detector 12 as well. The storage controller 13 stores the received sequence header and the PI in a channel information table of the memory 14. At this time, the storage controller 13 maps the sequence header and the PI to relevant channel numbers and stores them, in storing the sequence header and the PI. The channel number signal denotes a channel number created in response to the channel change command received from the user. Typically, if a user inputs a channel change command via a predetermined input unit (not shown), a channel change signal and a channel number signal can be created by the input unit (not shown) and inputted.

The storage controller 13 updates a channel information table on the memory 14 whenever the sequence header and the PI are received from the detector 12. The storage controller 13 can extract information (hereinafter referred to as initialized information) necessary for establishing an initial value of the video decoder 19 from the sequence header detected by the detector 12 and store the information in a region relevant to the channel information table of the memory 14.

Now, referring to FIGS. 2 and 3, explanation will be made on the sequence header and the channel information table. Reference numeral 1 in FIG. 3 denotes a video stream and 2 represents a sequence header.

Figure 2:
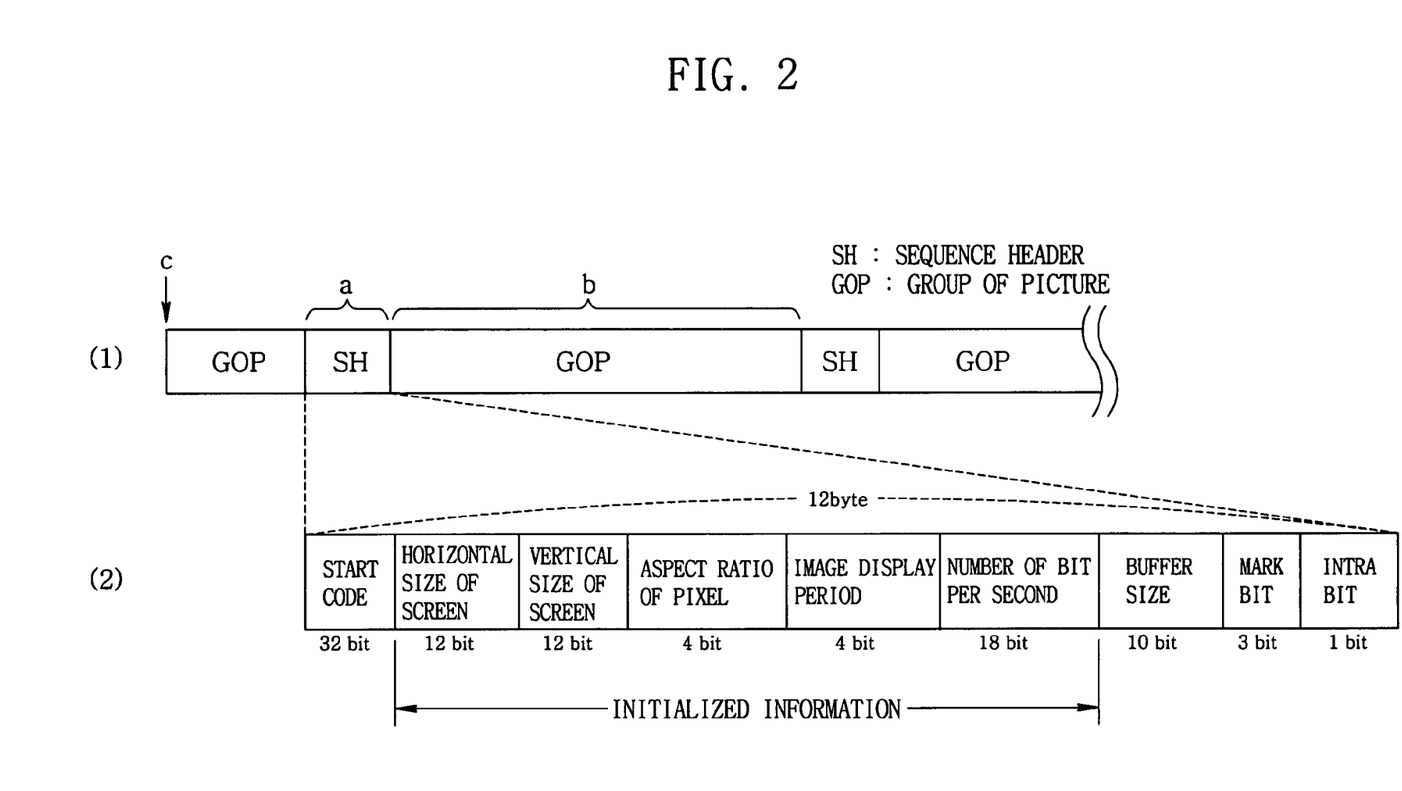
FIG. 2 is a drawing illustrating a structure of a video stream and a sequence header.

The video stream in FIG. 2 (1) has a structure in which a sequence header (a) and a Group of Picture (GOP. a sequence of video frames) are repeated. Referring to FIG. 2, it can be seen that a video stream outputted from the detector 12 starts from c following the channel change in response to a channel change signal.

Referring FIG. 2 (2), the sequence header (a) has a size of 12 bytes and includes a sequence header start code (32 bits. A1), a screen horizontal size (12 bits. a2), a screen vertical size (12 bits. a3), a pixel aspect ratio (4 bits. a4), an image display period (4 bits. a5), number of bit per second (18 bits. a6), a buffer size (10 bits. a7), a mark bit (3 bits. a8) and an Intra bit (1 bit. a9).

The initial information in the sequence header (a) includes a screen horizontal size (s2), a screen vertical size (a3), a pixel aspect ratio (a4), an image display period (a5) and number of bit per second (a6).

Figure 3:
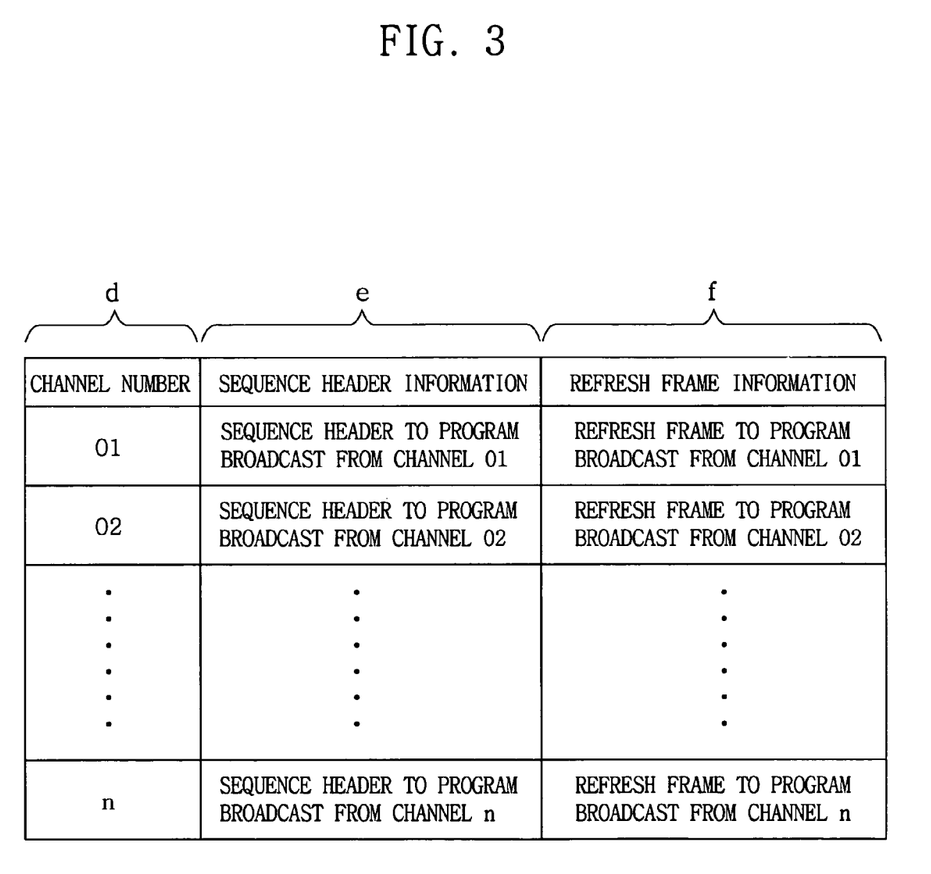
FIG. 3 is a drawing illustrating a channel information table according to one embodiment of the present invention.

FIG. 3 is a drawing illustrating a channel information table according to one embodiment of the present invention, where the channel information table includes a channel number region (d), a PI region (e) and a sequence header region (f).

The PI region (e) and the sequence header region (f) are mapped per channel number. As a result, the memory 14 can be stored only with the PI region (e) and the sequence header region (f). The sequence header region (f) may include initial information instead of a sequence header.

Referring to FIG. 1 again, constituent parts of the broadcasting receiving apparatus 100 will be described.

The memory 14 is stored with a sequence header and a PI detected by the detector 12 in response to control of the storage controller 13. The sequence header and the PI stored in the memory 14 are included in a predetermined channel information table. The channel information table includes a sequence header and a PI with respect to at least one channel number.

According to another embodiment of the present invention, a channel information table of the memory 14 may store only initialized information along with a PI.

The sequence header detection discriminator 15 discriminates whether a sequence header is contained in front of a video stream initially inputted from the detector 12 by being channel-changed. This is identical to discrimination on whether a sequence header is included in front of a video stream initially inputted from the video decoder 19.

For the discrimination thus mentioned, the sequence header detection discriminator 15 receives a video stream number inputted from the demultiplexer 11 to the detector 12 following the channel change, whereby input of video stream having the same number into the detector 12 is checked. Successively, the sequence header detection discriminator 15 discriminates whether the sequence header has been outputted from the detector 12, based on which the discriminator 15 discriminates whether the sequence header is contained in front of the video stream initially inputted into the detector 12 following the channel change.

The sequence header is recommended to be inserted into a video stream per 0.5 second and transmitted in the ATSC digital television standard document A/54. However, it is just a recommendation. Accordingly, there is a difference in an insertion time of the sequence header according to broadcasting stations or broadcasting contents producers, and broadcasting stations or broadcasting contents producers generally insert a sequence header into the video stream at a time interval longer than the recommended time of 0.5 second.

The sequence header detection discriminator 15 outputs to the comparator 16 a discrimination result of whether the sequence header is contained in the front of the video stream initially inputted into the detector 12 following the channel change.

If the sequence header is detected not to be included in the front of the initial video stream following the channel change as a result of the discrimination of the sequence header detection discriminator 15, the comparator 16 compares the PI detected by the detector 12 with the PI mapped to a channel number relevant to the channel information table of the memory 14 and stored therein. The comparator 16 outputs the comparative result to the sequence header extractor 17.

The sequence header extractor 17 can check a channel number changed by receipt of a channel number signal, and if the two PIs are identical as the result of the comparison, the sequence header extractor 17 extracts the sequence header mapped to the relevant channel number and stored in the channel information table of the memory 14.

The sequence header inserter 18 receives a sequence header or initialized information from the sequence header extractor 17, and receives a video stream from demultiplexer 11. The sequence header inserter 18 inserts the sequence header received from the sequence header extractor 17 into the video stream.

If the sequence header inserter 18 uses the initialized information to restore the sequence header to be inserted into the video stream, and inserts the restored sequence header into the video stream if the initialized information is received.

The video decoder 19 decodes the video stream inserted by the sequence header to a video signal and outputs it to the display apparatus 20, allowing a user to visually recognize the video signal.

If programs are identical, a horizontal size of a screen, a vertical size of a screen, an aspect ratio of a screen, a display period of an image, number of bit per second are the same, such that sequence headers containing these information are the same.

Accordingly, the sequence header extracted from the sequence header region (e) of the channel information table of the memory 14 contains information necessary for establishing an initial value of the video decoder 19 including resolutions of the video streams received from the changed channel, aspect ratios of the pixels, display periods of images.

The decoded video signal is optimally outputted to a screen for a viewer to view because it has been decoded by the video decoder 19 initialized by the initial information.

Figure 4:
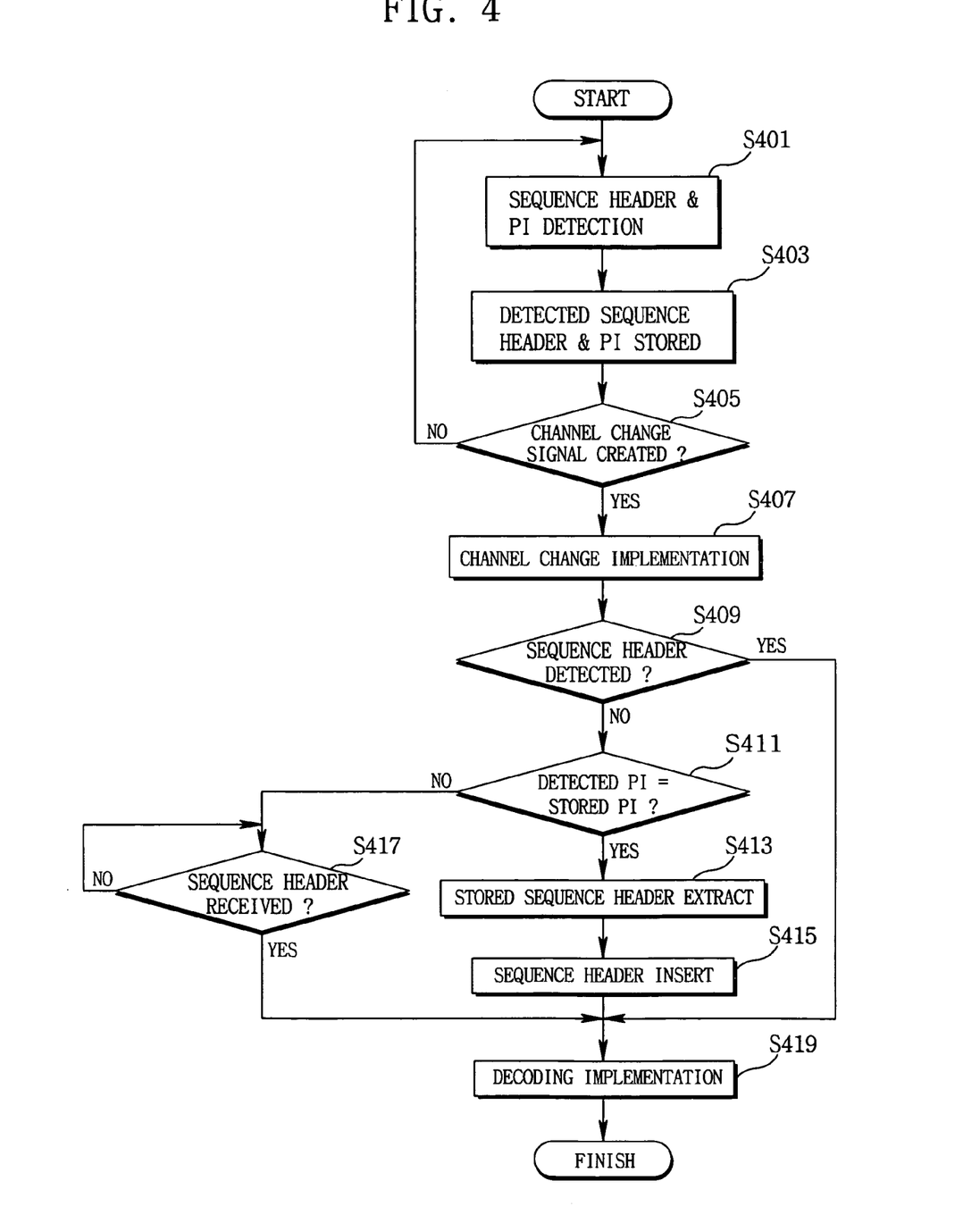
FIG. 4 is a flowchart provided for explanation of image display delay time shortening method during channel change according to the present invention.

FIG. 4 is a flowchart provided for explanation of image display delay time shortening method during channel change according to the present invention. Hereinafter, the image display delay time shortening method during the channel change of a broadcasting receiving apparatus according to the present invention will be described with reference to FIGS. 1 through 4.

The detector 12 detects a sequence header from the received video stream and detects a PI from data stream (S401).

The storage controller 13 stores the sequence header and the PI detected by the detector 12 in a relevant region of the channel information table of the memory 14 using the channel number signal. The storage controller 13 extracts from the sequence header detected by the detector 12 only the data necessary for establishing the initial values of the video decoder 19, i.e., a horizontal size of a screen, a vertical size of a screen, an aspect ratio of pixel, a display period of image and number of bit per second, and stores them in the sequence header region (f) of the channel information table of the memory 14 (S403).

If a channel change signal is created by channel change by a user (S405), the tuner 10 receives a broadcasting signal of a channel selected by the user in response to the channel change signal so that the channel change can be implemented (S407).

If the channel change signal is created, the sequence header detection discriminator 15 receives a video stream number of the changed channel from the demultiplexer 11. The sequence header detection discriminator 15 discriminates whether the video stream inputted from the detector 12 contains the sequence header based on the video stream number received by the sequence header detection discriminator 15 (S409).

As a result of the discrimination at S409, if the sequence header is not detected from the video stream, the comparator 16 compares the PI detected by the detector 12 with the PI mapped to a channel number relevant to the channel information table of the memory 14 and stored therein to see if they are identical (S411).

As a result of the comparison at S411, if the PIs are identical, the sequence header extractor 17 uses the channel change signal to extract a sequence header or an initialized information stored in the relevant region of the channel information table of the memory 14 (S413).

The sequence header inserter 18 inserts the sequence header or the initialized information extracted by the sequence header extractor 17 into the received video stream (S415).

As a result of the comparison at S411, if the PIs are not identical, the steps of S413 and S415 are not performed. In this case, the video decoder 19 waits until the sequence header is received and implements the decoding of the video stream if the sequence header is received (S417) because the sequence header stored in the relevant region of the channel information table of the memory 14 cannot be utilized.

If the sequence header is inserted into the video stream, the video decoder 19 uses the sequence header information to establish an initial value, and implements the decoding of the video stream inserted by the sequence header in response to the established initial value (S419).

As a result of discrimination at S409, if the sequence header has been detected from the video stream within a predetermined time, the steps of S411 through S417 are not implemented. The video decoder 19 uses the detected sequence header information to establish an initial value of the video decoder 19 to implement the decoding of the video stream.

As mentioned earlier, if the video decoder 19 cannot perform the decoding operation because there is included no sequence header in the video stream received at the start of the channel change, the sequence header information stored in the relevant region of the channel information table of the memory 14 is utilized for the video decoder 19 to perform the decoding and to enable to instantly display an image on a screen.

Figure 5:
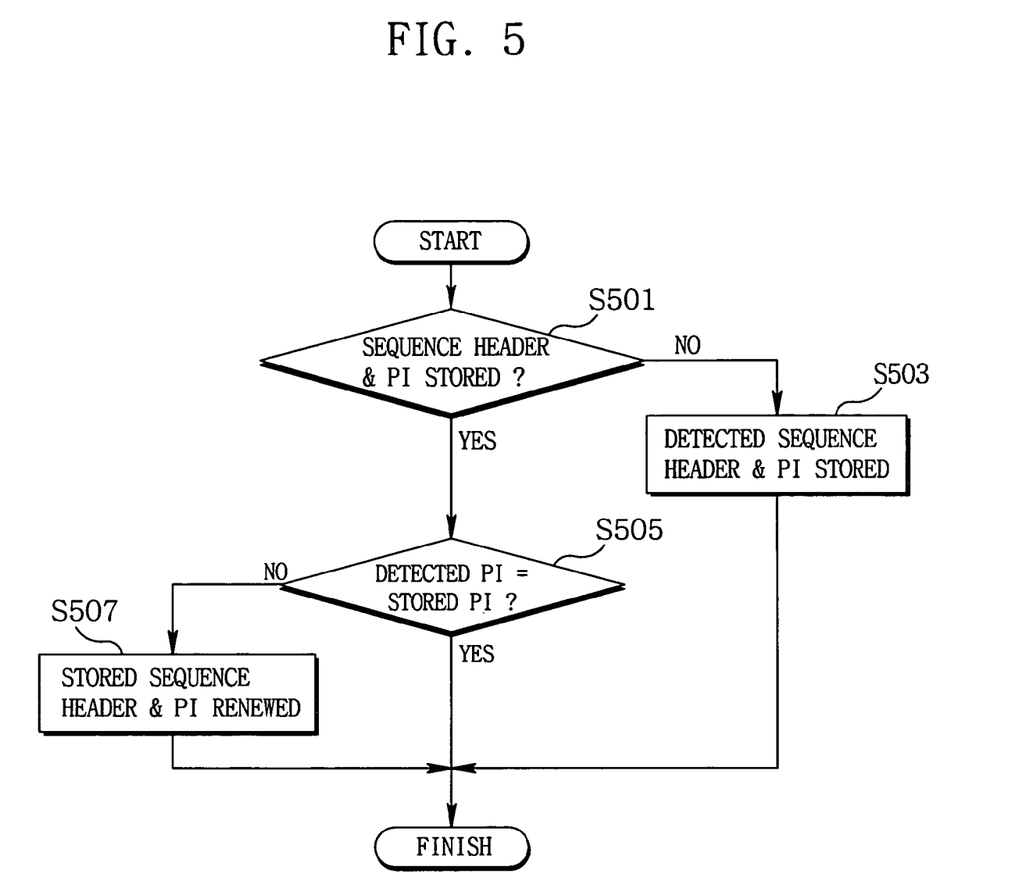
FIG. 5 is a flowchart illustrating an embodiment of a method for storing a sequence header and a program identifier in a memory.

Hereinafter, a method of storing initialized information in a channel information table will be described with reference to FIG. 5. Each step of FIG. 5 may be included in step S403 of FIG. 4. The methods of controlling the channel information table of the memory 14 may be variably provided. All the PIs and the sequence headers received by the detector 12 may be recorded. Furthermore, the most recent PI and a sequence header thereto may be recorded in the relevant channel number based on channel number, which is illustrated in FIG. 5.

If sequence header and PI are received from the detector 12, the storage controller 13 checks whether sequence header and PI previously stored by being correspondent to a current channel number are available in the relevant region of the channel information table in the memory 14 (S501).

As a result of the check at S501, if the sequence header and PI previously stored by being correspondent to the current channel number are not available in the relevant region of the channel information table in the memory 14, the storage controller 13 stores the detected sequence header and the PI in the relevant region of the channel information table of the memory 14 (S503).

As a result of check at S501, if the sequence header and PI previously stored by being correspondent to the current channel number are available in the relevant region of the channel information table in the memory 14, the storage controller 13 comparatively discriminates whether the detected PI and the PI previously stored in the channel information table of the memory 14 are the same (S505).

As a result of the comparative discrimination at S505, if the PIs are not identical, the storage controller 13 renews the sequence header and the PI stored in the channel information table of the memory 14 by being correspondent to the current channel number to the detected sequence header and PI (S507).

As described above, the relevant region of the channel information table of the memory 14 can be stored with a sequence header and a PI relative to a video stream of a recent program broadcast in the channel by storing the received sequence header and PI in the relevant region of the channel information table of the memory 14 using the channel number signal and renewing the sequence header and the PI.

The broadcasting receiving apparatus according to the present invention is such that a sequence header is detected from a received video stream and is stored in a channel information table of a memory, and a sequence header corresponding to a changed channel can be extracted from a relevant region of the channel information table of the memory if the channel is to be changed and inserted into a video stream to establish an initial value of a video decoder. As a result, a time can be shortened in which a sequence header is received and an image starts to be properly displayed.

The present invention may be embodied in a method, an apparatus and a system. Furthermore, if the present invention is to be embodied in a computer software, constituent parts of the present invention may be replaced by code segments needed for implementing necessary operations. Programs or code segments may be stored in a medium which can be processed by a microprocessor, and may be transmitted to a computer data coupled to carrier wave through transmission media or communication networks.

The media which can be processed by the microprocessor include any gadgets which can transmit and store information, such as electronic circuits, semiconductor memory devices, ROMs (Read Only Memory), flash memories, EEPROMs (Erasable Electronic Programmable Read Only Memory), floppy discs, optical discs, hard discs, optical fibers, radio networks and the like. Furthermore, computer data include data to be transmittable through electrical network channels, optical fibers, electromagnetic fields, radio networks and the like.

While specific embodiments have been described, it is evident that many alternatives, modifications, permutations and variations will become apparent to those skilled in the art in light of the foregoing description. Accordingly, reference should be made to the following claims, rather than to the foregoing specification, as indicating the scope of the invention. In this regard, the description above is intended by way of example only and is not intended to limit the present invention in any way, except as set forth in the following claims. Furthermore, to the extent that the term "includes" is used in either the detailed description or the claims, such term is intended to be inclusive in a manner similar to the term "comprising" as "comprising" is interpreted when employed as a transitional word in a claim.

The invention claimed is:

1. An image display delay time shortening apparatus during channel change, the apparatus comprising:
    a detector configured to extract a program identifier (PI) and a sequence header from data stream and video stream initially input following a broadcasting channel change and to output the PI and sequence header;
    a memory storing the PI and the sequence header;
    a controller configured to extract the sequence header previously stored in the memory corresponding to the PI if there is no sequence header in front of the video stream initially input from the detector following the broadcasting channel change as a result of discrimination based on an output of the detector, and the PI stored in the memory is identical with a current PI extracted by the detector; and
    a sequence header inserter configured to insert the sequence header extracted by the controller into the video stream and to output the video stream inserted by the sequence header,
    wherein the controller is configured to compare the PI stored in the memory and the current PI extracted by the detector in response to a broadcasting channel change.

2. The apparatus as defined in claim 1, wherein the detector is further configured to extract the PI and sequence header from data streams and video streams continuously received prior to and after the broadcasting channel change, and the controller is further configured to store the sequence header corresponding to the PI whenever the sequence header and the PI are received from the detector.

3. The apparatus as defined in claim 2, wherein the controller is further configured to store a horizontal size of a screen, a vertical size of a screen, an aspect ratio of a pixel, an image display period and a number of bits per second contained in the sequence header thus extracted, in storing the extracted sequence header in the memory.

4. The apparatus as defined in claim 1, wherein the controller comprises:
    a sequence header detection discriminator configured to discriminate whether the sequence header is contained in front of a video stream initially input from the detector following the broadcasting channel change based on the output of the detector; and
    a sequence header extractor configured to extract the sequence header previously stored in the memory corresponding to the PI and to output the sequence header to the sequence header inserter if the sequence header is not contained in the front of the video stream as a result of the discrimination by the sequence header detection discriminator.

5. A broadcasting receiving apparatus comprising:
    a detector configured to extract a program identifier (PI) and a sequence header from data stream and video stream initially input following a broadcasting channel change and to output PI and sequence header;
    a memory storing the PI and the sequence header;
    a controller configured to extract the sequence header previously stored in the memory corresponding to the PI if there is no sequence header in front of the video stream initially input from the detector following the broadcasting channel change as a result of discrimination based on output of the detector, and the PI stored in the memory is identical with a current PI extracted by the detector;
    a sequence header inserter configured to insert the sequence header extracted by the controller into the video stream and to output the video stream inserted by the sequence header;
    a video decoder configured to decode the video stream output from the sequence header inserter; and
    a display apparatus configured to display the data decoded by the video decoder for visual recognition,
    wherein the controller is configured to compare the PI stored in the memory and the current PI extracted by the detector in response to a broadcasting channel change.

6. The apparatus as defined in claim 5, wherein the detector is further configured to extract the PI and sequence header from data streams and video streams continuously received prior to and after the broadcasting channel change, and the controller is further configured to store the sequence header corresponding to the PI whenever the sequence header and the PI are received from the detector.

7. The apparatus as defined in claim 5, wherein the controller comprises:
    a sequence header detection discriminator configured to discriminate whether a sequence header is contained in front of a video stream input from the detector following the broadcasting channel change based on the output from the detector; and
    a sequence header extractor configured to extract the sequence header previously stored in the memory correspondent to the PI and to output the sequence header to the sequence header inserter, if the sequence header is not included as a result of discrimination by the sequence header detection discriminator.

8. An image display delay time shortening method during a channel change, the method comprising:

detecting a program identifier (PI) and a sequence header from data stream and video stream separated from an initially received transfer stream following a broadcasting channel change;

comparing the PI stored in the memory and a current PI extracted by the detector in response to a broadcasting channel change;

extracting a previously stored sequence header corresponding to the PI if there is no sequence header in front of the video stream initially separated following the broadcasting channel change as a result of discrimination from the detecting step, and the PI stored in the memory is identical with the current PI extracted by the detector;

inserting the extracted sequence header into the video stream; and     decoding the video stream which the sequence header is inserted into and displaying the decoded video stream as a visually recognizable image.

9. The method as defined in claim 8, further comprising:

extracting the PI and sequence header from data streams and video streams continuously received prior to or following the broadcasting channel change and storing the PI and the sequence header.

10. The method as defined in claim 9, wherein the step of extracting and storing the sequence header comprises:

storing the extracted PI and the sequence header in a predetermined table corresponding to a channel number, and     wherein the table is renewed by the PI and the sequence header extracted from the data streams and the video streams continuously received prior to or following the broadcasting channel change.

11. The method as defined in claim 9, wherein the step of extracting and storing the sequence header comprises:

extracting a horizontal size of a screen, a vertical size of a screen, an aspect ratio of a pixel, an image display period and a number of bits per second from the extracted sequence header and storing the horizontal and vertical size of the screen, the aspect ratio of the pixel, the image display period and the number of bits per second.

\* \* \* \* \*